United States Patent
Hayasaka

(10) Patent No.: US 9,881,203 B2
(45) Date of Patent: Jan. 30, 2018

(54) IMAGE PROCESSING DEVICE, IMAGE PROCESSING METHOD, AND PROGRAM

(71) Applicant: NEC Corporation, Minato-ku, Tokyo (JP)

(72) Inventor: Akihiro Hayasaka, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/914,321

(22) PCT Filed: Aug. 26, 2014

(86) PCT No.: PCT/JP2014/072258
§ 371 (c)(1),
(2) Date: Feb. 25, 2016

(87) PCT Pub. No.: WO2015/029982
PCT Pub. Date: Mar. 5, 2015

(65) Prior Publication Data
US 2016/0217318 A1    Jul. 28, 2016

(30) Foreign Application Priority Data
Aug. 29, 2013  (JP) ................. 2013-178461

(51) Int. Cl.
*G06K 9/00* (2006.01)
*G06T 3/60* (2006.01)

(52) U.S. Cl.
CPC ..... *G06K 9/00248* (2013.01); *G06K 9/00281* (2013.01); *G06K 9/00288* (2013.01); *G06T 3/60* (2013.01)

(58) Field of Classification Search
USPC .............. 382/118, 154, 190, 216, 275, 295; 700/245, 248, 259; 340/5.83; 348/152,
(Continued)

(56) References Cited

U.S. PATENT DOCUMENTS 7,486,825 B2 *  2/2009  Yuasa ................ G06K 9/00281
                                                          382/118
8,331,616 B2    12/2012  Sabe et al.
(Continued)

FOREIGN PATENT DOCUMENTS

JP     2004-288222 A    10/2004
JP     2009-020761 A    1/2009
(Continued)

OTHER PUBLICATIONS

International Search Report for PCT Application No. PCT/JP2014/072258, dated Nov. 18, 2014.
(Continued)

*Primary Examiner* — Anh H Do

(57) ABSTRACT

An image processing device (10) includes a posture estimation unit (110) that estimates posture information including a yaw angle and a pitch angle of a person's face from an input image including the person's face, and an image conversion unit (120) that generates a normalized face image in which an orientation of a face is corrected, on the basis of positions of a plurality of feature points in a face region image which is a region including the person's face in the input image, positions of the plurality of feature points in a three-dimensional shape model of a person's face, and the posture information.

10 Claims, 8 Drawing Sheets

(58) Field of Classification Search
USPC .......................................................... 348/267
See application file for complete search history.

(56) References Cited

U.S. PATENT DOCUMENTS

| | | | | |
|---|---|---|---|---|
| 8,396,262 | B2 * | 3/2013 | Aisaka | ............... G06K 9/00261 |
| | | | | 340/5.83 |
| 8,751,048 | B2 * | 6/2014 | Shimizu | ................. B25J 9/1679 |
| | | | | 700/245 |
| 8,761,462 | B2 * | 6/2014 | Sun | .................... G06K 9/00248 |
| | | | | 348/267 |
| 9,463,575 | B2 * | 10/2016 | Shimizu | ................. B25J 9/1679 |
| 2009/0262989 | A1 | 10/2009 | Kozakaya | |

FOREIGN PATENT DOCUMENTS

| JP | 2009-053916 A | 3/2009 |
|---|---|---|
| JP | 4946730 B | 6/2012 |
| JP | 5018029 B | 9/2012 |

OTHER PUBLICATIONS

Tatsuo Kosakatani et al., "Projection-based 3D Normalization for Face Recognition", IEICE Technical Report, vol. 105, No. 375, Oct. 21, 2005 (Oct. 21, 2005), pp. 49 to 54. English abstract.

* cited by examiner

IMAGE PROCESSING DEVICE, IMAGE PROCESSING METHOD, AND PROGRAM

This application is a National Stage Entry of PCT/JP2014/072258 filed on Aug. 26, 2014, which claims priority from Japanese Patent Application 2013-178461 filed on Aug. 29, 2013, the contents of all of which are incorporated herein by reference, in their entirety.

TECHNICAL FIELD

The present invention relates to an image processing device, an image processing method, and a program.

BACKGROUND ART

At present, personal authentication techniques using an image including a person's face have been put into practical use. In such personal authentication techniques, the collation between face images having different postures is one of great technical problems.

Regarding such a problem, methods are disclosed in which face images different from an input face image are generated and collated by using a three-dimensional shape model of a face.

For example, Patent Document 1 discloses a method of acquiring a two-dimensional image and three-dimensional face shape information of a person serving as a subject, and collating the person in the two-dimensional image, using two-dimensional features obtained by correcting two-dimensional image texture on the basis of posture and shape change information between a standard model which is a three-dimensional model of a general face prepared in advance and the acquired three-dimensional face shape information, and three-dimensional feature points obtained from the three-dimensional face shape information.

In addition, Patent Document 2 discloses a method in which, after the posture of a face is estimated using a stable feature point regardless of a person, other feature points conspicuously exhibiting differences for each person are converted into specific postures using a three-dimensional shape model of a standard face, and collation is performed by comparing feature amounts of positions of the other feature points.

In addition, Patent Document 3 discloses a method of generating a partial region image in which partial regions in the vicinity of feature points are deformed so as to be set to the same orientation of a face as a reference image face, on the basis of feature points disposed on a standard three-dimensional shape model of a face, feature points of a face in an input image, and information of the orientation of a face in the input image, and collating the partial region image with the reference image.

RELATED DOCUMENTS

Patent Documents

[Patent Document 1] Japanese Patent No. 5018029
[Patent Document 2] Japanese Patent No. 4946730
[Patent Document 3] Japanese Unexamined Patent Publication No. 2004-288222

SUMMARY OF THE INVENTION

However, in Patent Document 1, it is necessary to acquire three-dimensional shape information of a person which is a target for collation. Since special instruments such as a range finder are required for acquiring three-dimensional shape information of an object, there is the possibility of a use environment being limited. Further, since it is necessary not only to acquire the three-dimensional shape information, but also to extract respective feature amounts from both the two-dimensional image texture and the three-dimensional shape information, calculation costs are high.

In addition, in Patent Document 2, when a posture is estimated on the basis of a correspondence relation between feature point coordinates of a face in an image and feature point coordinates on a standard face three-dimensional model, only four points of both eyes, a nose, and a mouth are used as stable feature points regardless of a person. For this reason, when erroneous detection of feature points or an outlier value is present, there is a high possibility of an erroneous posture being estimated.

In addition, in Patent Document 3, when a posture is converted using information of the orientation of a face which is acquired beforehand by some kind of method, the posture is converted only with respect to the partial region in the vicinity of feature points, which leads to a great influence of erroneous detection of feature points. In addition, this is considered as a method which is not suitable for a case where the global feature of the entire face is used for collation.

The present invention is contrived in view of the above problems, and the object thereof is to provide an image processing device, an image processing method, and a program which are capable of generating an accurately normalized image without any special instrument.

According to the present invention, there is provided an image processing device including: a posture estimation unit that estimates posture information including a yaw angle and a pitch angle of a person's face from an input image including the person's face; and an image conversion unit that generates a normalized face image in which an orientation of a face is corrected, on the basis of positions of a plurality of feature points in a face region image which is a region including the person's face in the input image, positions of the plurality of feature points in a three-dimensional shape model of a person's face, and the posture information.

According to the present invention, there is provided an image processing method including causing a computer to: estimate posture information including a yaw angle and a pitch angle of a person's face from an input image including the person's face; and generate a normalized face image in which an orientation of a face is corrected, on the basis of positions of a plurality of feature points in a face region image which is a region including the person's face in the input image, positions of the plurality of feature points in a three-dimensional shape model of a person's face, and the posture information.

According to the present invention, there is provided a program causing a computer to function as: a posture estimation unit that estimates posture information including a yaw angle and a pitch angle of a person's face from an input image including the person's face; and an image conversion unit that generates a normalized face image in which an orientation of a face is corrected, on the basis of positions of a plurality of feature points in a face region image which is a region including the person's face in the input image, positions of the plurality of feature points in a three-dimensional shape model of a person's face, and the posture information.

According to the present invention, it is possible to generate an accurately normalized image without any special instrument.

BRIEF DESCRIPTION OF THE DRAWINGS

The above-mentioned objects, other objects, features and advantages will be made clearer from the preferred embodiments described below, and the following accompanying drawings.

DESCRIPTION OF EMBODIMENTS

Figure 1:
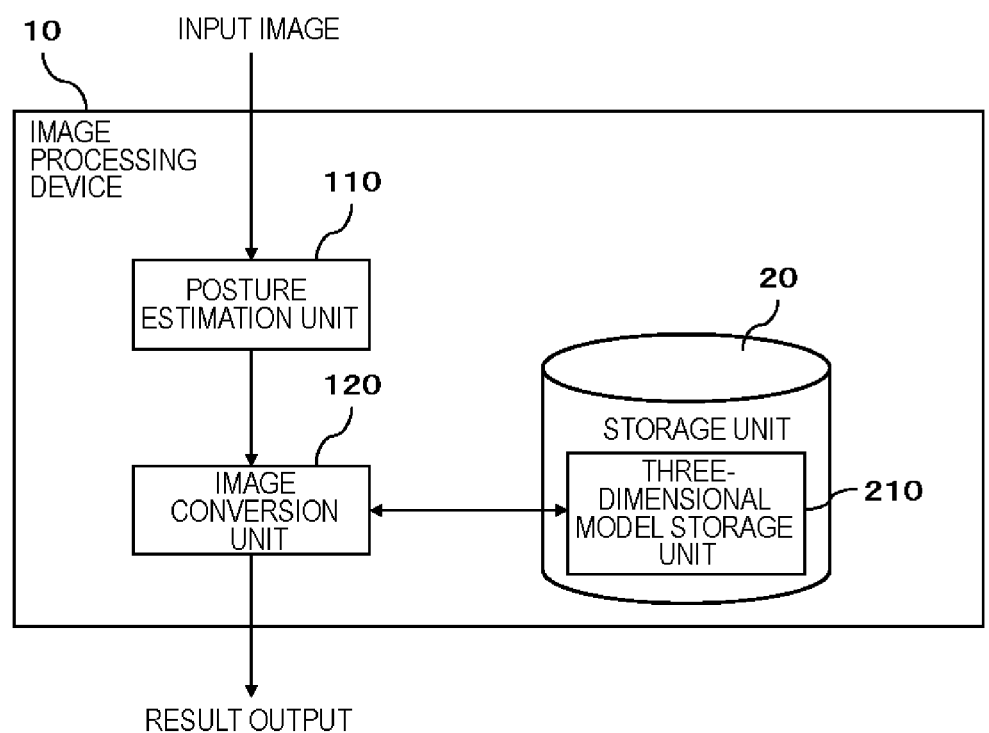
FIG. 1 is a block diagram illustrating a configuration example of an image processing device in a first embodiment.

Hereinafter, embodiments of the present invention will be described with reference to the accompanying drawings. In all the drawings, like elements are referenced by like reference numerals and descriptions thereof will not be repeated.

(First Embodiment)

FIG. 1 is a block diagram illustrating a configuration example of an image processing device 10 in a first embodiment. The image processing device 10 includes a posture estimation unit 110 and an image conversion unit 120.

The posture estimation unit 110 estimates posture information of a person's face from an input image including a person's face. This "posture information" refers to information indicating the posture of a person's face, and includes at least the yaw angle and the pitch angle of the person's face. The posture information can also refer to information indicating the orientation of a person's face.

The posture estimation unit 110 can estimate the posture information of a person's face in an input image using various methods. For example, with face identifying devices corresponding to respective postures having different yaw angles and pitch angles being prepared in a storage unit (not shown), the posture estimation unit 110 can comprehensively determine results of comparison between a face region image including at least a person's face in an input image and each of the face identifying devices, and estimate posture information including the yaw angle and the pitch angle of the person's face in the input image. In addition, the posture estimation unit 110 may estimate a person's posture in the input image using a subspace method. In addition, the posture estimation unit 110 may acquire the three-dimensional shape of a face simultaneously with the acquisition of a face region image from the input image, and estimate the posture of a person's head in the input image from a correspondence relation between the three-dimensional shape of the acquired face and the three-dimensional shape of an average frontal face stored in a storage area or the like of the image processing device 10 in advance. In this case, an ICP (Iterative Closest Point) algorithm or the like can be used in association between the three-dimensional shapes. Meanwhile, the details of a method of estimating the posture information are disclosed in, for example, the following documents.

Ando and Kusachi et al., "Pose Estimation of 3D Object Using Support Vector Regression", Journal of the Institute of Electronics, Information and Communication Engineers Yamada and Nakashima et al., "Head Pose Estimation using the Factorization and Subspace Method", Technology Research Report of the Institute of Electronics, Information and Communication Engineers, PRMU Japanese Unexamined Patent Publication No. 2011-209116

Yoichi Sato, "Computer Vision Techniques for Tracking Human Faces", Journal of the Institute of Image Information and Television Engineers However, the method of estimating of the above-mentioned posture information is merely exemplified, and the posture estimation unit 110 can also estimate the posture information of a person's face using other well-known methods.

The image conversion unit 120 generates a normalized face image in which the orientation of a face is corrected, on the basis of positions of a plurality of feature points in a face region image, positions of a plurality of feature points in a three-dimensional shape model of a person's face, and the posture information acquired by the posture estimation unit 110. Here, considering that a collation process or the like of a face image is performed, it is preferable to perform correction so that a normalized face image which is looking forward is generated. In this case, the image conversion unit 120 uses a three-dimensional shape model with a face looking forward. Hereinafter, in the present embodiment, a case where a forward-looking normalized face image is generated will be described by way of example.

The image conversion unit 120 generates a normalized face image using the face region image and the three-dimensional shape model which is stored in a three-dimensional model storage unit 210 of a storage unit 20. Here, the three-dimensional model storage unit 210 stores a three-dimensional shape model of an average frontal face and positions of a plurality of feature points in the three-dimensional shape model. This "three-dimensional shape model of an average frontal face" can be generated by averaging a plurality of face image samples looking forward, or the like. In addition, a plurality of "three-dimensional shape models of an average frontal face" may be prepared for each attribute such as age or sex. Meanwhile, in FIG. 1, the image processing device 10 includes the storage unit 20, but other devices located outside of the image processing device 10 may include the storage unit 20. In this case, the image processing device 10 acquires a three-dimensional shape model through communication with the other devices in a wired or wireless manner.

Specifically, the image conversion unit 120 generates a normalized face image as follows. First, the image conversion unit 120 determines a correspondence relation between a plurality of feature points on the three-dimensional shape model and a plurality of feature points on the face region image. Next, the image conversion unit 120 rotates the three-dimensional shape model using the posture information acquired by the posture estimation unit 110 so that the posture of the three-dimensional shape model of a face (orientation of a face) becomes the same as the posture of the face region image. The image conversion unit 120 calculates geometric transformation parameters for converting between a coordinate system of the input image and a coordinate system of the three-dimensional shape model based on a correspondence relation between positions of a plurality of feature points of the three-dimensional shape model corrected to the same posture and positions of a plurality of feature points in the face region image. The image conversion unit 120 calculates coordinates when the three-dimensional shape model of a frontal face is projected onto the coordinate system of the input image, using the calculated geometric transformation parameters.

For example, the three-dimensional shape model of a frontal face is constituted by a plurality of points, and each point constituting this three-dimensional shape model is equivalent to one pixel of the normalized face image. The image conversion unit 120 projects (forward projects) each point constituting the three-dimensional shape model onto a two-dimensional input image, using the calculated geometric transformation parameter, and thus can determine color information (pixel value) which should be included in each point of the three-dimensional shape model. Specifically, the image conversion unit 120 determines a pixel value corresponding to a position on a two-dimensional image onto which each point constituting the three-dimensional shape model is projected, as a pixel value which should be included in each point of the three-dimensional shape model. The image conversion unit 120 can determine a pixel value of each pixel of the normalized face image on the basis of a correspondence relation between each point of the three-dimensional shape model and the normalized face image. An image conversion process which is performed by the image conversion unit 120 is not a forward conversion process but a backward conversion process. Specifically, the image conversion unit 120 determines which portion on the two-dimensional image each of the coordinates of the normalized face image corresponds to, through the three-dimensional shape model, and acquires the pixel value of each pixel of the normalized face image from the two-dimensional image (backward conversion process). Therefore, the image conversion unit 120 determines which portion of the normalized face image each of the coordinates of the two-dimensional image corresponds to, and thus can generate a more accurate normalized face image than in a case where a forward conversion process of embedding a pixel value corresponding to each of the coordinates of the two-dimensional face image in the normalized face image is used.

In this manner, the image conversion unit 120 performs a backward conversion process on each point constituting the three-dimensional shape model, and thus can generate a normalized face image in which the position and size of a face and the orientation of a face are corrected uniformly. Meanwhile, a coordinate value when each point of the three-dimensional shape model is projected onto the two-dimensional image on the basis of the geometric transformation parameter is not necessarily an integer value. When a coordinate value projected onto the two-dimensional image is a fractional value, it is preferable to interpolate the pixel value of each pixel of the normalized face image, using a neighboring pixel of the projected coordinates. In such a case, the image conversion unit 120 can interpolate the pixel value of each pixel of the normalized face image, using any method such as, for example, nearest neighbor interpolation or bilinear interpolation.

Meanwhile, each component of the image processing device 10 shown in the drawing represents a function-based block rather than a hardware-based configuration. Each component of the image processing device 10 is embodied by any combination of hardware and software based on a CPU and a memory of any computer, a program, loaded into the memory, for realizing each component shown in the drawing, storage media such as a hard disk having the program stored thereon, and an interface for network connection. Embodying methods and devices thereof may be modified in various ways.

Figure 2:
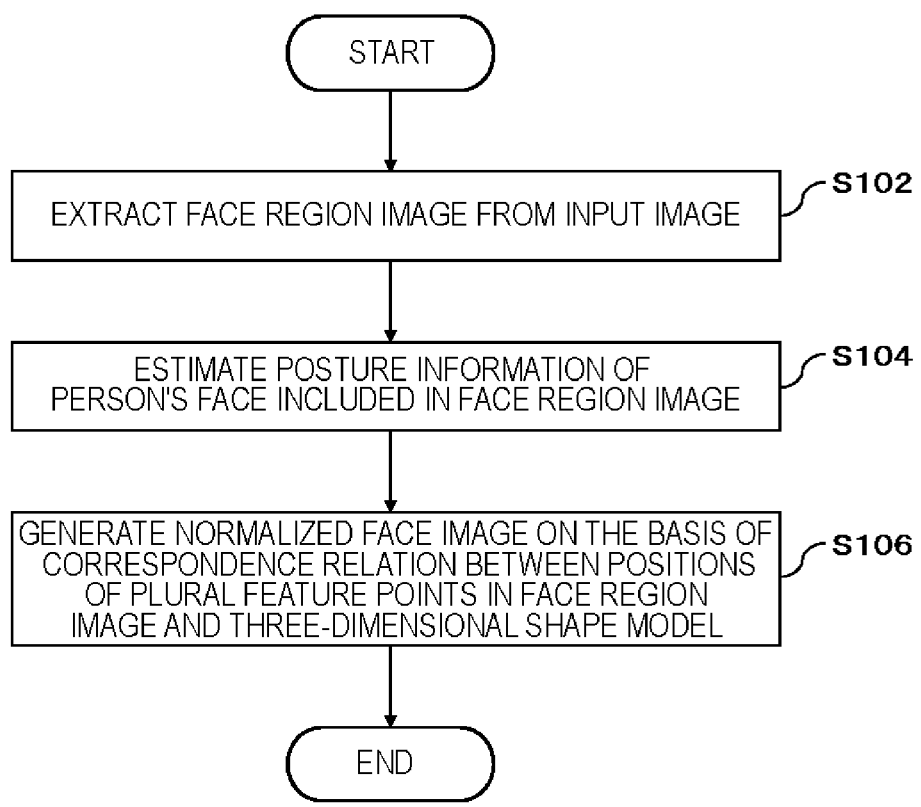
FIG. 2 is a flow diagram illustrating a flow of processes of the image processing device in the first embodiment.

A flow of processes of the image processing device 10 in the present embodiment will be described with reference to FIG. 2. FIG. 2 is a flow diagram illustrating a flow of processes of the image processing device 10 in the first embodiment.

The image processing device 10 extracts a face region image from an input image (S102). Here, the extracted face region image only needs to include a person's face in the input image, and may be the input image itself and a portion of the input image. The image processing device 10 estimates posture information of the person's face included in the face region image (S104). The image processing device 10 generates a normalized face image in which the orientation of a face is corrected, on the basis of a correspondence relation between positions of a plurality of feature points in the extracted face region image and positions of a plurality of feature points of the three-dimensional shape model of a face, and the posture information estimated in S104 (S106).

As described above, in the present embodiment, the three-dimensional shape model of a face is rotated to the same posture (orientation of a face) as the person's face in the input image. A geometric transformation parameter capable of converting between the coordinate axes of the input image and the coordinate axes of the three-dimensional shape model is calculated based on a correspondence relation between positions of a plurality of feature points in the input image and positions of feature points of the rotated three-dimensional shape model. The normalized face image in which the orientation of a face is corrected is generated using the calculated geometric transformation parameter.

Thereby, according to the present embodiment, when the geometric transformation parameter is estimated, it is possible to reduce the influence of a feature point which is erroneously detected or a feature point for which a correct position is not able to be detected due to occlusion or the like. That is, it is possible to estimate a more probable geometric transformation parameter. When the geometric transformation parameters estimated in this manner are used, it is thus possible to generate a higher-accuracy normalized face image. For example, even with respect to a face image in which some feature points are hidden due to the posture of the person's face in the input image and thus normalization is not likely to be performed, it is possible to accurately estimate hidden feature points by making the three-dimensional shape model conform to the posture of the input image, and to generate a higher-accuracy normalized face image.

In addition, according to the present embodiment, the posture of the person's face is estimated from the input image, and thus it is possible to achieve high versatility without any special instrument such as a range finder.

In addition, the normalized face image which is generated by the image processing device 10 is converted to a state where the position, size and orientation of a face are fixed. Here, when the position, size, and orientation of a face in the normalized face image are set so as to conform to the position, size and orientation of a face of correct data used in a collation process of face authentication, it is possible to improve the accuracy of the collation process.

(Second Embodiment)

In the present embodiment, a detailed process configuration of an image conversion unit 120 will be described below. In addition, an image processing device 10 of the present embodiment further includes a configuration for collating a face image.

The image processing device 10 in the present embodiment generally operates as follows. First, the image processing device 10 calculates geometric transformation parameters based on a correspondence relation between a position of each feature point in an input face image and a position on the three-dimensional shape model. The image processing device 10 optimizes (corrects) the geometric transformation parameter so that the sum of squares of a re-projection error is minimized. Here, regarding a yaw angle and a pitch angle when the geometric transformation parameter is calculated or optimized, a yaw angle and a pitch angle estimated from an input image are used. Since the yaw angle and the pitch angle estimated from the input image have accuracies higher than those of the yaw angle and the pitch angle calculated from a correspondence relation between positions of the respective feature points, the image processing device 10 can estimate a higher-accuracy geometric transformation parameter.

Figure 3:
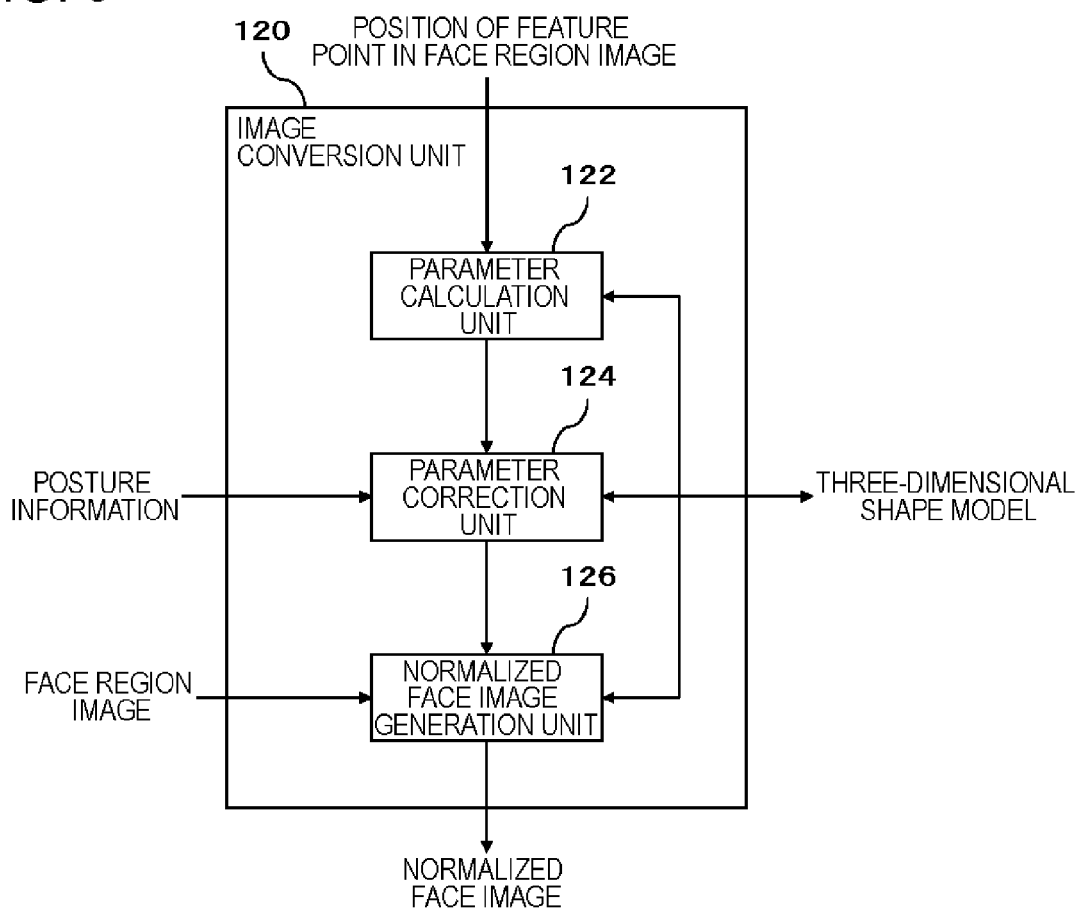
FIG. 3 is a block diagram illustrating a detailed process configuration of an image conversion unit.

FIG. 3 is a block diagram illustrating a detailed process configuration of the image conversion unit 120. In FIG. 3, the image conversion unit 120 includes a parameter calculation unit 122, a parameter correction unit 124, and a normalized face image generation unit 126.

The parameter calculation unit 122 calculates geometric transformation parameters capable of converting between the coordinate system of the input image and the coordinate system of the three-dimensional shape model, on the basis of a correspondence relation between positions of a plurality of feature points in the face region image and positions of a plurality of feature points in the three-dimensional shape model.

The parameter correction unit 124 corrects the geometric transformation parameter calculated in the parameter calculation unit 122, on the basis of the posture information estimated by the posture estimation unit 110.

The normalized face image generation unit 126 generates a normalized face image in which the orientation of a face is corrected, on the basis of the geometric transformation parameter corrected by the parameter correction unit 124.

Figure 4:
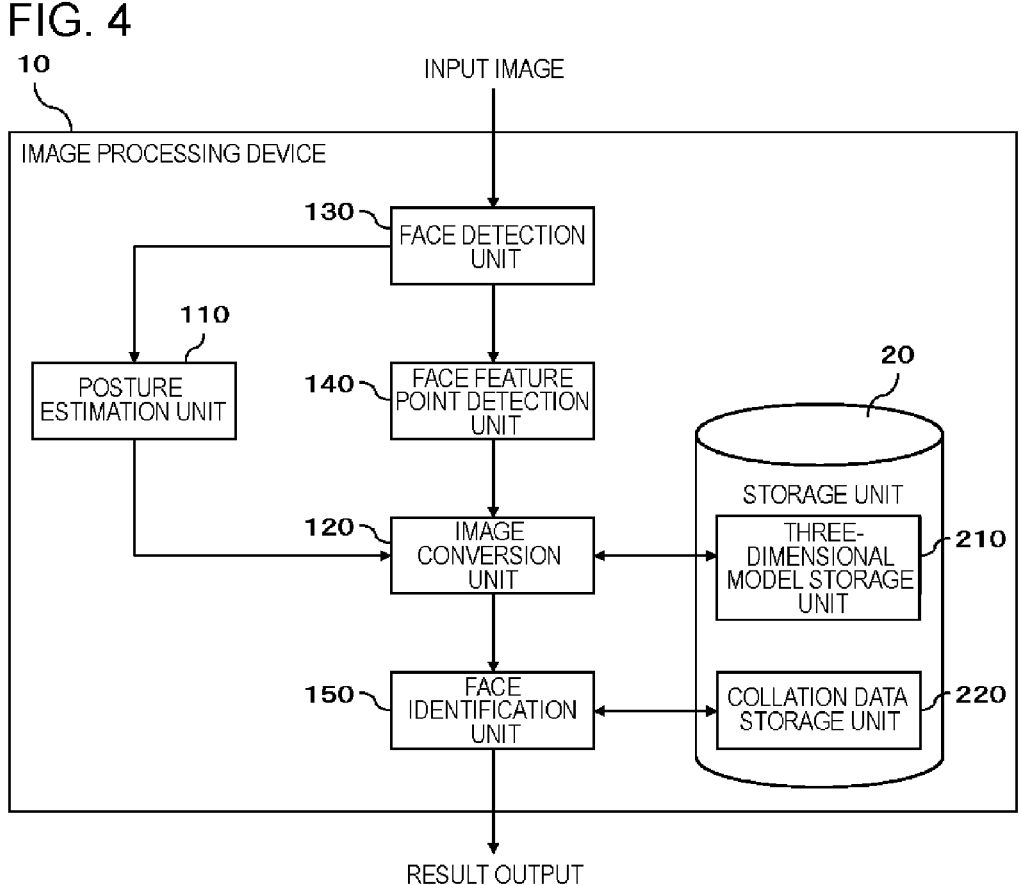
FIG. 4 is a block diagram illustrating a process configuration example of an image processing device in a second embodiment.

FIG. 4 is a block diagram illustrating a process configuration example of the image processing device 10 in the second embodiment. In FIG. 4, the image processing device 10 further includes a face detection unit 130, a face feature point detection unit 140, and a face identification unit 150.

In addition, in FIG. 4, the storage unit 20 further includes a collation data storage unit 220. The collation data storage unit 220 stores collation data which is used for collating a person of the normalized face image. The "collation data" as used herein refers to data with which information indicating a specific person is associated with respect to certain face image data. That is, it can also be said that the collation data is face image data capable of specifying a certain person.

The face detection unit 130 detects and extracts a region (face region image) including a face from the input image. Meanwhile, the face detection unit 130 can use any face detection algorithm. For example, the face detection unit 130 can use a face detection algorithm or the like using a Haar-like feature and AdaBoost proposed by Viola et al. The face region image detected by the face detection unit 130 is input to the posture estimation unit 110 and the face feature point detection unit 140.

The face feature point detection unit 140 detects feature points from the face image region detected by the face detection unit 130. For example, the face feature point detection unit 140 detects an eye, a nose, a mouth, contours of a face, and the like as the feature points. Meanwhile, the face feature point detection unit 140 can use any algorithm for detecting feature points from the face image region. For example, the face feature point detection unit 140 can use a feature point detection algorithm using a Haar-like feature and AdaBoost, similarly to the face detection unit 130. In addition, the face feature point detection unit 140 may detect the feature points of a face, using Active Shape Model, Active Appearance Model, or the like.

The face identification unit 150 extracts feature amounts from the normalized face image generated by the image conversion unit 120, and specifies a person of the input image by collating the extracted feature amounts with the feature amounts of the collation data stored in the collation data storage unit 220. The face identification unit 150 outputs the specified person as a collation result.

A flow of processes of the image processing device 10 in the present embodiment will be described with reference to FIGS. 5 and 6.

Figure 5:
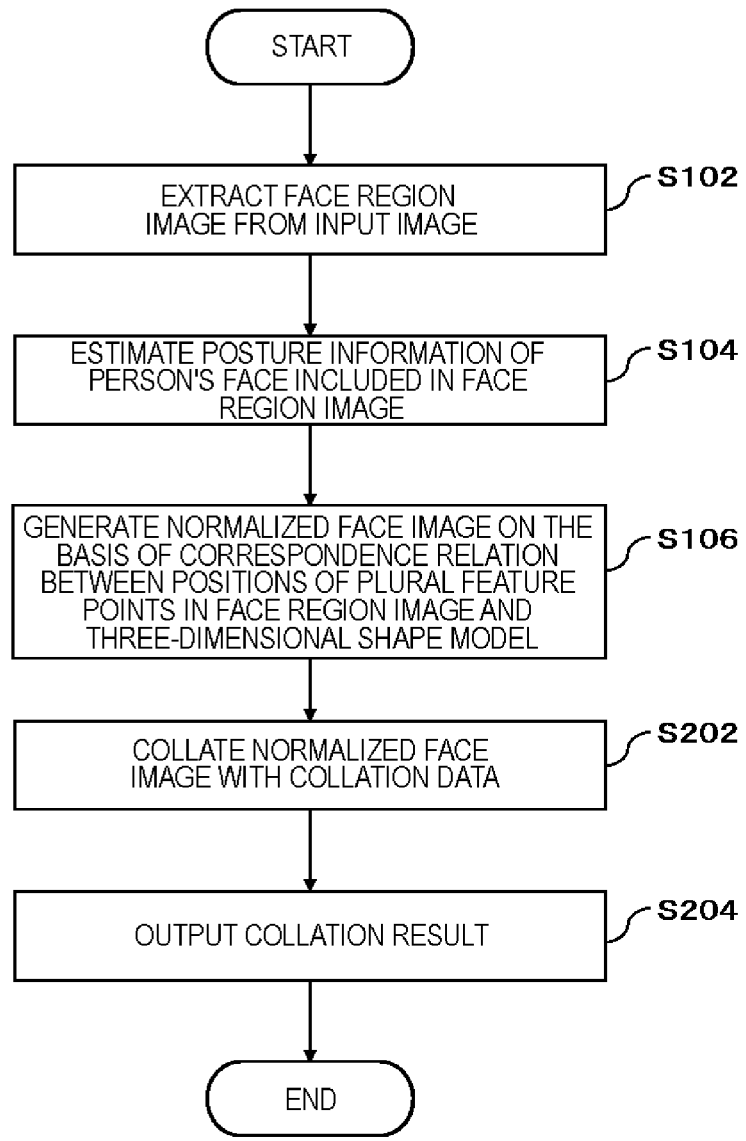
FIG. 5 is a flow diagram illustrating a flow of processes of the image processing device in the second embodiment.
Figure 6:
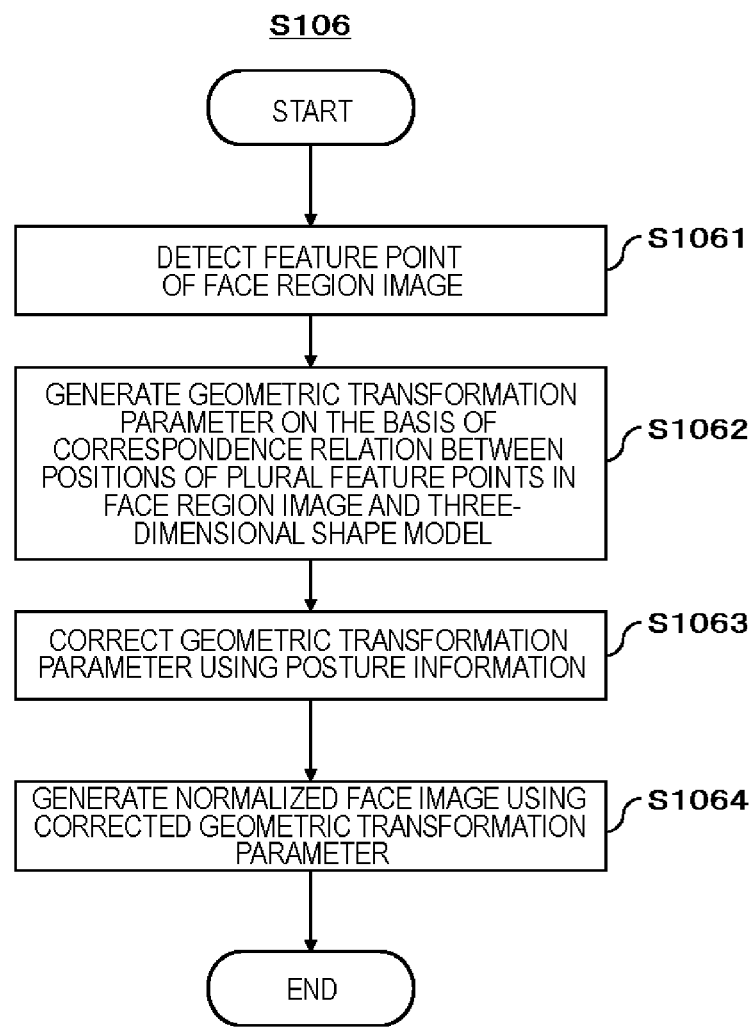
FIG. 6 is a flow diagram illustrating a detailed flow of a process of S106.

FIG. 5 is a flow diagram illustrating a flow of processes of the image processing device 10 in the second embodiment. A flow of processes from S102 to S106 is as described in the first embodiment. Specifically, the image processing device 10 extracts a face region image including a person's face from an input image, using any face detection algorithm (S102). The image processing device 10 estimates posture information of the person's face included in the face region image (S104).

Here, a detailed flow of S106 will be described with reference to FIG. 6. FIG. 6 is a flow diagram illustrating a detailed flow of a process of S106.

The image processing device 10 detects positions $(u_n, v_n)$ of n feature points (n is an integer of 1 or greater) from the face region image extracted in S102, using any feature point detection algorithm (S1061).

The image processing device 10 calculates geometric transformation parameters on the basis of a correspondence relation between the feature points $(u_n, v_n)$ detected in S1061 and feature points $(X_n, Y_n, Z_n)$ in the three-dimensional shape model (S1062). Specifically, the image processing device 10 calculates the geometric transformation parameter as follows.

The following Expression 1 is an expression indicating a correspondence relation between the coordinates on the input image and the coordinates on the three-dimensional shape model. In the following Expression 1, a matrix represented by 3 rows and 4 columns is a perspective projection transformation matrix for transforming between the coordinate system on the input image and the coordinate system on the three-dimensional shape model. The image processing device 10 derives geometric transformation parameters included in the perspective projection transformation matrix, on the basis of the feature points $(u_n, v_n)$ detected in the face region image, the feature points $(X_n, Y_n, Z_n)$ in the three-dimensional shape model corresponding to the feature points $(u_n, v_n)$, and the following Expression 1.

$$w \begin{bmatrix} u_n \\ v_n \\ 1 \end{bmatrix} = \begin{bmatrix} p_{11} & p_{12} & p_{13} & p_{14} \\ p_{21} & p_{22} & p_{23} & p_{24} \\ p_{31} & p_{32} & p_{33} & 1 \end{bmatrix} \begin{bmatrix} X_n \\ Y_n \\ Z_n \\ 1 \end{bmatrix} \quad \text{(Expression 1)}$$

Here, the following Expression 2 can be obtained from Expression 1.

(Expression 2)

$$\begin{bmatrix} X_1 & Y_1 & Z_1 & 1 & 0 & 0 & 0 & 0 & -u_1X_1 & -u_1Y_1 & -u_1Z_1 \\ 0 & 0 & 0 & 0 & X_1 & Y_1 & Z_1 & 1 & -v_1X_1 & -v_1Y_1 & -v_1Z_1 \\ & & & & & \vdots \\ 0 & 0 & 0 & 0 & X_n & Y_n & Z_n & 1 & -v_nX_n & -v_nY_n & -v_nZ_n \end{bmatrix} \begin{bmatrix} p_{11} \\ p_{12} \\ p_{13} \\ p_{14} \\ p_{21} \\ p_{22} \\ p_{23} \\ p_{24} \\ p_{31} \\ p_{32} \\ p_{33} \end{bmatrix} = \begin{bmatrix} u_1 \\ v_1 \\ \vdots \\ v_n \end{bmatrix}$$

A perspective projection transformation matrix of 3 rows and 4 columns can be obtained, using a linear least-squares method with respect to Expression 2.

QR decomposition is performed on the obtained perspective projection transformation matrix, and thus the perspective projection transformation matrix can be decomposed as shown in the following Expression 3.

(Expression 3)

$$w\begin{bmatrix} u_n \\ v_n \\ 1 \end{bmatrix} = K[R|T]\begin{bmatrix} X_n \\ Y_n \\ Z_n \\ 1 \end{bmatrix} = \begin{bmatrix} k_u & s & u_0 \\ 0 & k_v & v_0 \\ 0 & 0 & 1 \end{bmatrix}\begin{bmatrix} R(\alpha,\beta,\gamma) & \begin{matrix} t_x \\ t_y \\ t_z \end{matrix} \end{bmatrix}\begin{bmatrix} X_n \\ Y_n \\ Z_n \\ 1 \end{bmatrix}$$

In Expression 3, "K" is a matrix indicating an intrinsic parameter of a camera, and the degree of freedom is 5. In addition, "R" and "T" are a matrix indicating extrinsic parameters of a camera, and the degree of freedom is 6. Meanwhile, "R" is an extrinsic parameter relating to rotation, "α" indicates a yaw angle, "β" indicates a pitch angle, and "γ" indicates a roll angle. In addition, "T" is an extrinsic parameter relating to a parallel shift component. In this manner, the geometric transformation parameter included in the perspective projection transformation matrix has a degree of freedom of 11 in total.

Meanwhile, in Expression 2, the parameter may be calculated by an eigenvalue calculation or the like rather than a linear least-squares method. Alternatively, coordinate transformation is performed in which the origin of the coordinate system of each feature point in the input image and the origin or scale of the coordinate system of each feature point on the three-dimensional shape model are previously aligned, and thus geometric transformation parameters by which coordinates when each feature point is projected are set to have approximately proper positions may be calculated.

The image processing device 10 corrects the geometric transformation parameter using the posture information (yaw angle and pitch angle) estimated in S104 (S1063). Specifically, the image processing device 10 corrects the geometric transformation parameter as follows.

The image processing device 10 sets a yaw angle α and a pitch angle β of eleven geometric transformation parameters shown in Expression 3 to fixed values, and performs optimization so that the sum of squares of a re-projection error is minimized with respect to the remaining nine parameters. Here, regarding the yaw angle α and the pitch angle β, the yaw angle and the pitch angle which are included in the posture information estimated in S104 are used. In addition, regarding nine parameters other than the yaw angle α and the pitch angle β of the eleven geometric transformation parameters, the geometric transformation parameter calculated in S1062 is used as an initial value.

In addition, in the eleven geometric transformation parameters shown in Expression 3, the image processing device 10 may substitute the yaw angle and the pitch angle which are included in the posture information estimated in S104 as the initial value, and may perform optimization so that the sum of squares of a re-projection error is minimized with respect to the eleven parameters included in the perspective projection transformation matrix. In this case, the yaw angle α and the pitch angle β are restricted so as to be optimized within a predetermined range based on the yaw angle and the pitch angle which are included in the posture information estimated in S104. In this manner, it is possible to correct the geometric transformation parameter while preventing the values of the yaw angle and the pitch angle estimated in S104 from being greatly changed by an optimization process.

In addition, the image processing device 10 further includes an intrinsic parameter acquisition unit that acquires an intrinsic parameter having already been calibrated, and may set the acquired five intrinsic parameters and the yaw angle and the pitch angle estimated in the posture estimation unit 110 to fixed values to optimize the remaining four parameters. In this case, the five intrinsic parameters are calibrated by beforehand performing camera calibration or the like, for example, in an imaging device (not shown) having captured an input image, and are acquired together with the input image. In addition, the image processing device 10 can also receive a moving image as an input image, divide the moving image into continuous still images, and self-calibrate five intrinsic parameters from various postures of the same person in each still image. The image processing device 10 acquires the five intrinsic parameters calibrated in this manner, set seven parameters inclusive of the yaw angle and the pitch angle estimated in the posture estimation unit 110 to fixed values, and optimizes the remaining four parameters.

The image processing device 10 generates a normalized face image using the corrected geometric transformation parameter (S1064). Specifically, the image processing device 10 calculates coordinates when each feature point on the three-dimensional shape model is projected onto the coordinate system of the input image, on the basis of the corrected geometric transformation parameter and the coordinates of each feature point on the three-dimensional shape model. The image processing device 10 back-projects pixels corresponding to the calculated coordinates onto the three-dimensional shape model, using the corrected geometric transformation parameter. The image processing device 10 can generate a normalized face image in which the position and size of a face are fixed and the orientation of a person's face is corrected to the front, using the three-dimensional shape model onto which the pixels are back-projected.

The above is the detailed flow of S106.

FIG. 5 is referred back to. The image processing device 10 collates the normalized face image generated in S106 with collation data (S202). Specifically, the image processing device 10 extracts a feature amount from the normalized face image generated in S106. The extracted feature amount is optional, and, for example, a Gabor feature amount or the like which is extracted by using Gabor Wavelet of a plurality of frequencies and angles may be used. The extracted feature amount is represented by, for example, a vector. The image processing device 10 collates a feature amount vector extracted from the normalized face image with a feature amount vector of each piece of collation data stored in the collation data storage unit 220, and calculates the collation score. In the collation of the feature amount vectors, for example, normalized cross-correlation or a Euclidean distance can be used. In addition, the image processing device 10 projects the extracted feature amount vector onto a feature amount transformation matrix generated in advance by learning, and thus may convert the projected vector into a feature amount vector lower in dimension and excellent in identification performance and collate the normalized face image using the converted feature amount vector.

The image processing device 10 outputs the collation results of S202 to, for example, a display or the like (S204).

As described above, in the present embodiment, a person's face in the input image is collated using the face image generated by the image processing device 10. Thereby, according to the present embodiment, it is possible to improve the accuracy of a face authentication process.

In addition, in the present embodiment, in a state where some parameters of the geometric transformation parameters are fixed, the remaining parameters are optimized so that the sum of squares of a re-projection error is minimized. Thereby, it is possible to improve the accuracy of the optimization of the geometric transformation parameter. Therefore, it is possible to generate a normalized face image with a higher degree of accuracy. In addition, the number of optimized parameters decreases, and thus calculation costs can also be reduced.

(Third Embodiment)

The present embodiment is the same as the first and second embodiments, except for the following points.

Figure 7:
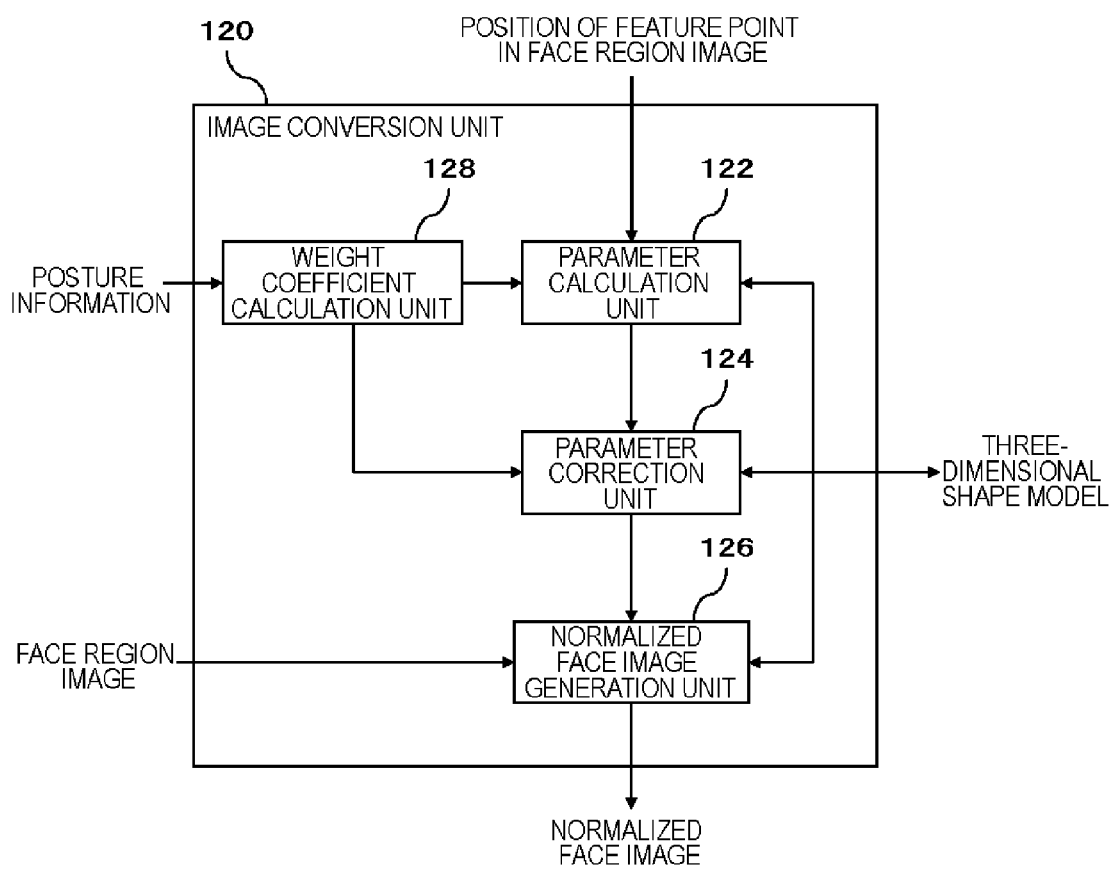
FIG. 7 is a block diagram illustrating a detailed process configuration of an image conversion unit in a third embodiment.

FIG. 7 is a block diagram illustrating a detailed process configuration of an image conversion unit 120 in a third embodiment. As shown in FIG. 3, the image conversion unit 120 of the present embodiment further includes a weight coefficient calculation unit 128, in addition to the process configuration of the image conversion unit 120 of the second embodiment.

The weight coefficient calculation unit 128 calculates a contribution rate (weight coefficient) which is given for each of a plurality of feature points, using the posture information of a person's face in the input image estimated in the posture estimation unit 110. Specifically, a distance between each feature point of a person's face and a predetermined reference point such as the lens center of an imaging device becomes different in accordance with the orientation of a person's face. Consequently, the weight coefficient calculation unit 128 sets a larger weight coefficient as the feature point becomes closer to the predetermined reference point, and sets a smaller weight coefficient as the feature point becomes more distant from the predetermined reference point. For example, when a person's face in the input image leans to the right side, the feature point of the left half of the face is located further forward than the feature point of the right half of the face. Therefore, a weight coefficient given to the feature point of the left half of the face becomes larger, and a weight coefficient given to the feature point of the right half of the face becomes smaller.

Specifically, the weight coefficient calculation unit 128 sets the weight coefficient of each feature point as follows. First, the weight coefficient calculation unit 128 rotates the three-dimensional face shape model on the basis of the posture information estimated in the posture estimation unit 110 so as to take the same posture as a person's face in the input image. Thereby, the weight coefficient calculation unit 128 can obtain depth information of each feature point on the rotated three-dimensional shape model. This "depth information" is information indicating a depth of each feature point on the three-dimensional shape model from a predetermined reference point. The weight coefficient calculation unit 128 set a larger weight coefficient as the feature point becomes closer to the predetermined reference point, on the basis of the depth information for each feature point.

The parameter calculation unit 122 of the present embodiment calculates geometric transformation parameters on the basis of the weight coefficient for each feature point calculated in the weight coefficient calculation unit 128. In addition, the parameter correction unit 124 of the present embodiment corrects the geometric transformation parameter on the basis of the weight coefficient for each feature point calculated in the weight coefficient calculation unit 128.

Figure 8:
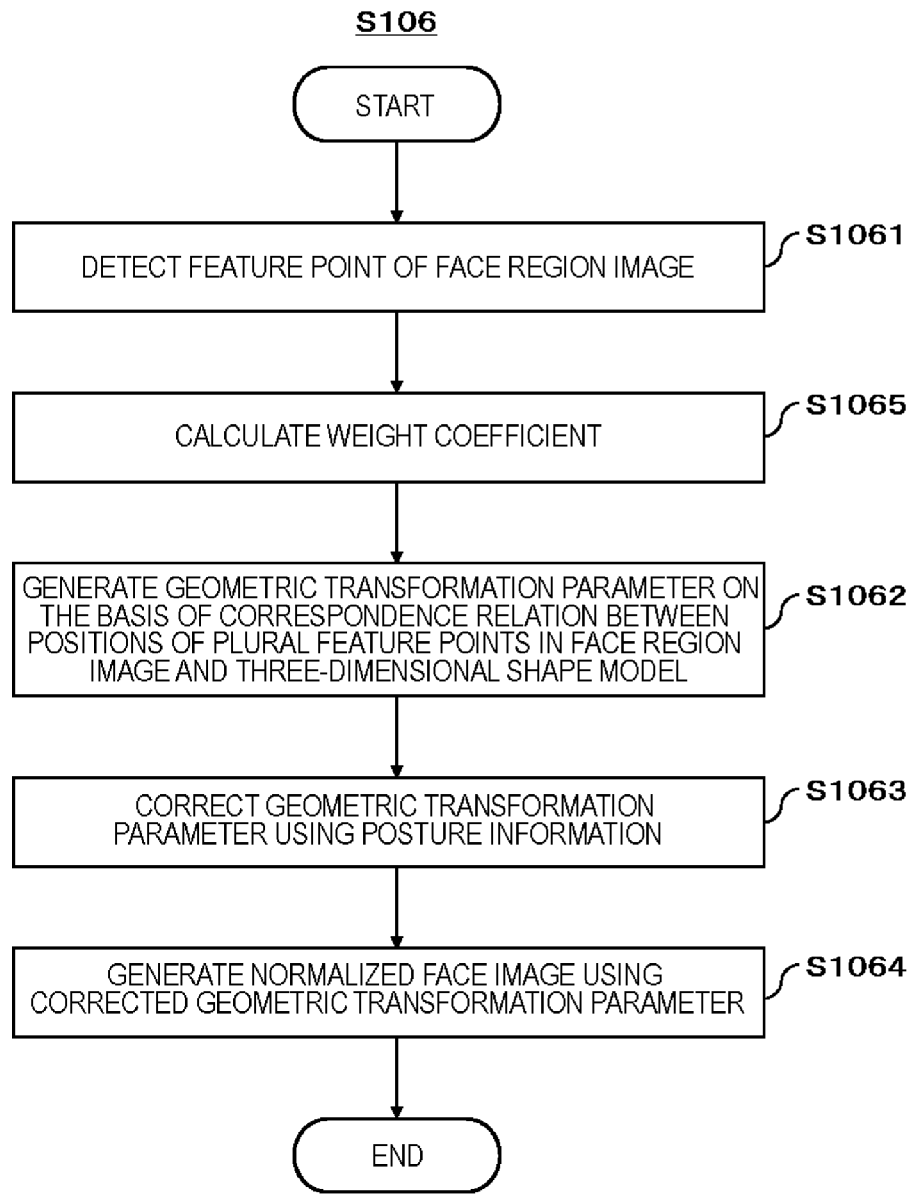
FIG. 8 is a flow diagram illustrating a detailed flow of a process of S106 in the third embodiment.

A flow of processes of the image processing device 10 in the present embodiment will be described with reference to FIG. 8. FIG. 8 is a flow diagram illustrating a detailed flow of a process of S106 in the third embodiment.

The image processing device 10 calculates a weight coefficient using the posture information estimated in the posture estimation unit 110 (S1065). Specifically, the image processing device 10 rotates the three-dimensional shape model using the posture information estimated in the posture estimation unit 110, and gives a weight coefficient for each feature point in accordance with a distance between each feature point of the rotated three-dimensional shape model and a predetermined reference point.

The image processing device 10 calculates geometric transformation parameters, further using the weight coefficient for each feature point calculated in S1065 (S1062). Specifically, the image processing device 10 calculates geometric transformation parameters as follows. First, Expression 2 can be represented as in the following Expression 4.

$$AP = B \quad \text{(Expression 4)}$$

Here, a diagonal matrix using the weight coefficient given to each feature point as a diagonal component is set to W. When a pseudo inverse matrix operation is performed in consideration of the weight coefficient given to each feature point in Expression 4, Expression 5 is obtained.

$$P = (A^T W A)^{-1} A^T W B \quad \text{(Expression 5)}$$

The image processing device 10 can obtain a perspective projection transformation matrix considering the weight coefficient given to each feature amount, on the basis of Expression 5. Regarding the subsequent processes, as is the case with the second embodiment, it is possible to calculate geometric transformation parameters from the perspective projection transformation matrix.

The image processing device 10 corrects the geometric transformation parameter, further using the weight coefficient for each feature point calculated in S1065 (S1063). Specifically, since a re-projection error is calculated for each feature point, the image processing device 10 calculates a re-projection error of each feature point in consideration of the weight coefficient corresponding to each feature point. As is the case with the second embodiment, the image processing device 10 corrects the geometric transformation parameter so that the sum of squares of a re-projection error is minimized.

As described above, in the present embodiment, the information of the orientation of a face (posture) is used as the reliability of each feature point. Thereby, according to the present embodiment, it is possible to increase the estimation accuracy of the geometric transformation parameter. A face image is normalized using the geometric transformation parameter estimated in this manner, and thus it is possible to improve the accuracy of a face authentication process.

As described above, although the embodiments of the present invention have been set forth with reference to the accompanying drawings, they are merely illustrative of the present invention, and various configurations other than those stated above can be adopted.

In addition, in a plurality of flow diagrams using the aforementioned description, a plurality of processes are described in order, but the execution order of processes which are executed in each embodiment is not limited to the described order. In each embodiment, the order of processes shown can be changed within a range without causing any problem in terms of contents. In addition, each embodiment described above can be combined in a range consistent with the contents thereof.

Hereinafter, examples of reference forms are appended.
1. An image processing device comprising:
    a posture estimation unit that estimates posture information including a yaw angle and a pitch angle of a person's face from an input image including the person's face; and
    an image conversion unit that generates a normalized face image in which an orientation of a face is corrected, on the basis of positions of a plurality of feature points in a face region image which is a region including the person's face in the input image, positions of the plurality of feature points in a three-dimensional shape model of a person's face, and the posture information.
2. The image processing device according to 1, wherein the image conversion unit includes:
    a parameter calculation unit that calculates geometric transformation parameters capable of converting between a coordinate system of the input image and a coordinate system of the three-dimensional shape model, on the basis of a correspondence relation between the positions of the plurality of feature points in the face region image and the three-dimensional shape model;
    a parameter correction unit that corrects the geometric transformation parameter on the basis of the posture information; and
    a normalized face image generation unit that generates the normalized face image on the basis of the corrected geometric transformation parameter.
3. The image processing device according to 2, wherein the geometric transformation parameters have five intrinsic parameters and six extrinsic parameters,
    the parameter calculation unit estimates a perspective projection transformation matrix including the geometric transformation parameter, on the basis of the correspondence relation between the positions of the plurality of feature points in the face region image and the three-dimensional shape model, and
    the parameter correction unit sets parameters excluding a yaw angle and a pitch angle of the geometric transformation parameters included in the perspective projection transformation matrix, and a yaw angle and a pitch angle included in the posture information to initial values, and corrects the geometric transformation parameter included in the perspective projection transformation matrix so that a sum of squares of a re-projection error of each of the feature points is minimized.
4. The image processing device according to 2, wherein the geometric transformation parameters have five intrinsic parameters and six extrinsic parameters,
    the parameter calculation unit estimates a perspective projection transformation matrix including the geometric transformation parameter, on the basis of the correspondence relation between the positions of the plurality of feature points in the face region image and the three-dimensional shape model, and
    the parameter correction unit sets, among the geometric transformation parameters included in the perspective projection transformation matrix, a yaw angle and a pitch angle included in the posture information to fixed values, and corrects the remaining nine parameters of the geometric transformation parameter so that a sum of squares of a re-projection error of each of the feature points is minimized.
5. The image processing device according to 2, wherein the geometric transformation parameters have five intrinsic parameters and six extrinsic parameters,
    the image processing device further comprises an intrinsic parameter acquisition unit that acquires five calibrated intrinsic parameters of the geometric transformation parameters,
    the parameter calculation unit estimates a perspective projection transformation matrix including the geometric transformation parameter, on the basis of the correspondence relation between the positions of the plurality of feature points in the face region image and the three-dimensional shape model, and
    the parameter correction unit sets, among the geometric transformation parameters included in the perspective projection transformation matrix, the five calibrated intrinsic parameters, and a yaw angle and a pitch angle included in the posture information to fixed values, and corrects the remaining four parameters of the geometric transformation parameter so that a sum of squares of a re-projection error of each of the feature points is minimized.
6. The image processing device according to any one of 2 to 5, wherein the image conversion unit further includes a weight coefficient calculation unit that calculates a weight coefficient which is given for each of the plurality of feature points, on the basis of the posture information,
    the parameter calculation unit calculates the geometric transformation parameter, further using the weight coefficient, and
    the parameter correction unit corrects the geometric transformation parameter, further using the weight coefficient.
7. The image processing device according to 6, wherein the weight coefficient calculation unit acquires depth information indicating a depth from a predetermined reference point for each of the plurality of feature points, in the three-dimensional shape model rotated on the basis of the posture information, and gives a larger weight to a feature point of the plurality of feature points being closer to the predetermined reference point, on the basis of the depth information.
8. The image processing device according to any one of 1 to 7, wherein the image conversion unit generates the normalized face image corrected to a state where a position, a size, and an orientation of a face are fixed.
9. An image processing method performed by a computer comprising:

estimating posture information including a yaw angle and a pitch angle of a person's face from an input image including the person's face; and generating a normalized face image in which an orientation of a face is corrected, on the basis of positions of a plurality of feature points in a face region image which is a region including the person's face in the input image, positions of the plurality of feature points in a three-dimensional shape model of a person's face, and the posture information.

10. The image processing method according to 9, further comprising:

calculating geometric transformation parameters capable of converting between a coordinate system of the input image and a coordinate system of the three-dimensional shape model, on the basis of a correspondence relation between the positions of the plurality of feature points in the face region image and the three-dimensional shape model;

correcting the geometric transformation parameter on the basis of the posture information; and generating the normalized face image on the basis of the corrected geometric transformation parameter.

11. The image processing method according to 10, wherein the geometric transformation parameters have five intrinsic parameters and six extrinsic parameters, and the image processing method further comprising:

estimating a perspective projection transformation matrix including the geometric transformation parameter, on the basis of the correspondence relation between the positions of the plurality of feature points in the face region image and the three-dimensional shape model; and setting parameters excluding a yaw angle and a pitch angle of the geometric transformation parameters included in the perspective projection transformation matrix, and a yaw angle and a pitch angle included in the posture information to initial values, and correct the geometric transformation parameter included in the perspective projection transformation matrix so that a sum of squares of a re-projection error of each of the feature points is minimized.

12. The image processing method according to 10, wherein the geometric transformation parameters have five intrinsic parameters and six extrinsic parameters, the image processing method further comprising:

estimating a perspective projection transformation matrix including the geometric transformation parameter, on the basis of the correspondence relation between the positions of the plurality of feature points in the face region image and the three-dimensional shape model; and setting, among the geometric transformation parameters included in the perspective projection transformation matrix, a yaw angle and a pitch angle included in the posture information to fixed values, and correct the remaining nine parameters of the geometric transformation parameter so that a sum of squares of a re-projection error of each of the feature points is minimized.

13. The image processing method according to 10, wherein the geometric transformation parameters have five intrinsic parameters and six extrinsic parameters, the image processing method further comprising:

acquiring five calibrated intrinsic parameters of the geometric transformation parameters;

estimating a perspective projection transformation matrix including the geometric transformation parameter, on the basis of the correspondence relation between the positions of the plurality of feature points in the face region image and the three-dimensional shape model; and setting, among the geometric transformation parameters included in the perspective projection transformation matrix, the five calibrated intrinsic parameters, and a yaw angle and a pitch angle included in the posture information to fixed values, and correct the remaining four parameters of the geometric transformation parameter so that a sum of squares of a re-projection error of each of the feature points is minimized.

14. The image processing method according to any one of 10 to 13, further comprising:

calculating a weight coefficient which is given for each of the plurality of feature points, on the basis of the posture information;

calculating the geometric transformation parameter, further using the weight coefficient; and correcting the geometric transformation parameter, further using the weight coefficient.

15. The image processing method according to 14, further comprising acquiring depth information indicating a depth from a predetermined reference point for each of the plurality of feature points, in the three-dimensional shape model rotated on the basis of the posture information, and give a larger weight to a feature point of the plurality of feature points being closer to the predetermined reference point, on the basis of the depth information.

16. The image processing method according to any one of 9 to 15, further comprising generating the normalized face image corrected to a state where a position, a size, and an orientation of a face are fixed.

17. A program causing a computer to function as:

a posture estimation unit that estimates posture information including a yaw angle and a pitch angle of a person's face from an input image including the person's face; and an image conversion unit that generates a normalized face image in which an orientation of a face is corrected, on the basis of positions of a plurality of feature points in a face region image which is a region including the person's face in the input image, positions of the plurality of feature points in a three-dimensional shape model of a person's face, and the posture information.

18. The program according to 17, causing the computer to function, in the image conversion unit, as:

a parameter calculation unit that calculates geometric transformation parameters capable of converting between a coordinate system of the input image and a coordinate system of the three-dimensional shape model, on the basis of a correspondence relation between the positions of the plurality of feature points in the face region image and the three-dimensional shape model;

a parameter correction unit that corrects the geometric transformation parameter on the basis of the posture information; and a normalized face image generation unit that generates the normalized face image on the basis of the corrected geometric transformation parameter.

19. The program according to 18, wherein the geometric transformation parameters have five intrinsic parameters and six extrinsic parameters, and the program causes the computer to:

in the parameter calculation unit, estimate a perspective projection transformation matrix including the geometric transformation parameter, on the basis of the correspondence relation between the positions of the plurality of feature points in the face region image and the three-dimensional shape model; and in the parameter correction unit, set parameters excluding a yaw angle and a pitch angle of the geometric transformation parameters included in the perspective projection transformation matrix, and a yaw angle and a pitch angle included in the posture information to initial values, and correct the geometric transformation parameter included in the perspective projection transformation matrix so that a sum of squares of a re-projection error of each of the feature points is minimized.

20. The program according to 18, wherein the geometric transformation parameters have five intrinsic parameters and six extrinsic parameters, and the program causes the computer to:

in the parameter calculation unit, estimate a perspective projection transformation matrix including the geometric transformation parameter, on the basis of the correspondence relation between the positions of the plurality of feature points in the face region image and the three-dimensional shape model; and in the parameter correction unit, set, among the geometric transformation parameters included in the perspective projection transformation matrix, a yaw angle and a pitch angle included in the posture information to fixed values, and correct the remaining nine parameters of the geometric transformation parameter so that a sum of squares of a re-projection error of each of the feature points is minimized.

21. The program according to 18, wherein the geometric transformation parameters have five intrinsic parameters and six extrinsic parameters, the program causes the computer to further function as an intrinsic parameter acquisition unit that acquires five calibrated intrinsic parameters of the geometric transformation parameters, and the program causes the computer to:

in the parameter calculation unit, estimate a perspective projection transformation matrix including the geometric transformation parameter, on the basis of the correspondence relation between the positions of the plurality of feature points in the face region image and the three-dimensional shape model; and in the parameter correction unit, set, among the geometric transformation parameters included in the perspective projection transformation matrix, the five calibrated intrinsic parameters, and a yaw angle and a pitch angle included in the posture information to fixed values, and correct the remaining four parameters of the geometric transformation parameter so that a sum of squares of a re-projection error of each of the feature points is minimized.

22. The program according to any one of 18 to 21, causing the computer to further function, in the image conversion unit, as a weight coefficient calculation unit that calculates a weight coefficient which is given for each of the plurality of feature points, on the basis of the posture information, and causing the computer to:

in the parameter calculation unit, calculate the geometric transformation parameter, further using the weight coefficient; and in the parameter correction unit, correct the geometric transformation parameter, further using the weight coefficient.

23. The program according to 22, causing the computer to, in the weight coefficient calculation unit, acquire depth information indicating a depth from a predetermined reference point for each of the plurality of feature points, in the three-dimensional shape model rotated on the basis of the posture information, and give a larger weight to a feature point of the plurality of feature points being closer to the predetermined reference point, on the basis of the depth information.

24. The program according to any one of 17 to 23, causing the computer to, in the image conversion unit, generate the normalized face image corrected to a state where a position, a size, and an orientation of a face are fixed.

The application claims priority from Japanese Patent Application No. 2013-178461 filed on Aug. 29, 2013, the entire contents of which are incorporated herein.

What is claimed is:

1. An image processing device comprising:
a processor; and
a memory storing instructions that, when executed by the processor, causes the processor to perform:
estimating posture information including a yaw angle and a pitch angle of a person's face from an input image including the person's face; and
generating a normalized face image in which an orientation of a face is corrected, on the basis of positions of a plurality of feature points in a face region image which is a region including the person's face in the input image, positions of the plurality of feature points in a three-dimensional shape model of a person's face, and the posture information.

2. The image processing device according to claim 1, wherein the instructions further causes the processor to perform:
calculating geometric transformation parameters capable of converting between a coordinate system of the input image and a coordinate system of the three-dimensional shape model, on the basis of a correspondence relation between the positions of the plurality of feature points in the face region image and the three-dimensional shape model;
correcting the geometric transformation parameter on the basis of the posture information; and
generating the normalized face image on the basis of the corrected geometric transformation parameter.

3. The image processing device according to claim 2, wherein the geometric transformation parameters have five intrinsic parameters and six extrinsic parameters, and
the instructions further causes the processor to perform:
estimating a perspective projection transformation matrix including the geometric transformation parameter, on the basis of the correspondence relation between the positions of the plurality of feature points in the face region image and the three-dimensional shape model; and
setting parameters excluding a yaw angle and a pitch angle of the geometric transformation parameters included in the perspective projection transformation matrix, and a yaw angle and a pitch angle included in the posture information to initial values, and corrects the geometric transformation parameter included in the perspective projection transformation matrix so that a sum of squares of a re-projection error of each of the feature points is minimized.

4. The image processing device according to claim 2, wherein the geometric transformation parameters have five intrinsic parameters and six extrinsic parameters, and
the instructions further causes the processor to perform:
estimating a perspective projection transformation matrix including the geometric transformation parameter, on the basis of the correspondence relation between the positions of the plurality of feature points in the face region image and the three-dimensional shape model; and setting, among the geometric transformation parameters included in the perspective projection transformation matrix, a yaw angle and a pitch angle included in the posture information to fixed values, and corrects the remaining nine parameters of the geometric transformation parameter so that a sum of squares of a re-projection error of each of the feature points is minimized.

5. The image processing device according to claim 2, wherein the geometric transformation parameters have five intrinsic parameters and six extrinsic parameters, and the instructions further causes the processor to perform:

acquiring five calibrated intrinsic parameters of the geometric transformation parameters;

estimating a perspective projection transformation matrix including the geometric transformation parameter, on the basis of the correspondence relation between the positions of the plurality of feature points in the face region image and the three-dimensional shape model and;

setting, among the geometric transformation parameters included in the perspective projection transformation matrix, the five calibrated intrinsic parameters, and a yaw angle and a pitch angle included in the posture information to fixed values, and corrects the remaining four parameters of the geometric transformation parameter so that a sum of squares of a re-projection error of each of the feature points is minimized.

6. The image processing device according to claim 2, wherein the instructions further causes the processor to perform:

calculating a weight coefficient which is given for each of the plurality of feature points, on the basis of the posture information;

calculating the geometric transformation parameter, further using the weight coefficient; and correcting the geometric transformation parameter, further using the weight coefficient.

7. The image processing device according to claim 6, wherein the instructions further causes the processor to perform acquiring depth information indicating a depth from a predetermined reference point for each of the plurality of feature points, in the three-dimensional shape model rotated on the basis of the posture information, and gives a larger weight to a feature point of the plurality of feature points being closer to the predetermined reference point, on the basis of the depth information.

8. The image processing device according to claim 1, wherein the instructions further causes the processor to perform generating the normalized face image corrected to a state where a position, a size, and an orientation of a face are fixed.

9. An image processing method performed by a computer comprising:

estimating posture information including a yaw angle and a pitch angle of a person's face from an input image including the person's face; and generating a normalized face image in which an orientation of a face is corrected, on the basis of positions of a plurality of feature points in a face region image which is a region including the person's face in the input image, positions of the plurality of feature points in a three-dimensional shape model of a person's face, and the posture information.

10. A non-transitory computer readable medium storing a program causing a computer to perform a method, the method comprising:

estimating posture information including a yaw angle and a pitch angle of a person's face from an input image including the person's face; and generating a normalized face image in which an orientation of a face is corrected, on the basis of positions of a plurality of feature points in a face region image which is a region including the person's face in the input image, positions of the plurality of feature points in a three-dimensional shape model of a person's face, and the posture information.

* * * * *